United States Patent [19]

Lohmar

[11] 4,352,892
[45] Oct. 5, 1982

[54] METHOD FOR THE MANUFACTURE OF LIGHTWEIGHT FOAM MATERIALS FROM CRYSTALLINE THERMOPLASTIC MATERIALS AND THE RESULTANT PRODUCTS

[75] Inventor: Ernst Lohmar, Weinheim an der Bergstrasse, Fed. Rep. of Germany

[73] Assignee: Firma Carl Freudenberg, Weinheim an der Bergstrasse, Fed. Rep. of Germany

[21] Appl. No.: 129,166

[22] Filed: Mar. 10, 1980

[30] Foreign Application Priority Data

Mar. 24, 1979 [DE] Fed. Rep. of Germany ....... 2911719

[51] Int. Cl.$^3$ .............................................. B29D 27/00
[52] U.S. Cl. ....................... 521/79; 264/22; 264/53; 264/DIG. 5; 264/DIG. 18; 521/89; 521/95; 521/96; 521/98; 521/140; 521/910; 521/915
[58] Field of Search ................... 264/DIG. 18, 53, 22, 264/DIG. 5; 521/79, 910, 915, 89, 95, 96, 98, 140

[56] References Cited

U.S. PATENT DOCUMENTS

| | | | |
|---|---|---|---|
| 3,137,745 | 6/1964 | Johnstone | 264/DIG. 18 |
| 3,240,727 | 3/1966 | Scalari et al. | 260/2.5 |
| 3,250,731 | 5/1966 | Buhl et al. | 264/DIG. 18 |
| 3,341,480 | 9/1967 | Feild | 264/DIG. 18 |
| 3,407,253 | 10/1968 | Yoshimura et al. | 264/289 |
| 3,452,123 | 6/1969 | Beckmann et al. | 264/DIG. 18 |
| 3,696,059 | 10/1972 | Hosoda et al. | 260/2.5 HA |
| 3,709,806 | 1/1973 | Minami et al. | 204/159.2 |
| 3,939,237 | 2/1976 | Naito et al. | 264/54 |
| 3,965,054 | 6/1976 | Nojiri et al. | 521/140 X |
| 3,981,830 | 9/1976 | Takeuchi et al. | 260/2.5 HA |
| 4,142,956 | 3/1979 | Shikinami et al. | 204/159.14 |
| 4,166,890 | 9/1979 | Fried et al. | 521/92 |

FOREIGN PATENT DOCUMENTS 1212291 11/1970 United Kingdom .

OTHER PUBLICATIONS

Bernhardt, Ernest C., Edit. "Processing Of Thermoplastic Materials", New York, Reinhold, ©1959, pp. 600, 606 and 616.
Ritchie, P. D., Edit. "Physics Of Plastics," Princeton, N. J., D. Van Nostrand, ©1965, pp. 272–275.
Billmeyer, Fred W., "Textbook Of Polymer Science," Second Edition, New York, Wiley-Interscience, ©1971, pp. 5, 6, 62–67, 73, 75–78, 84–89, 91–93.

Primary Examiner—Philip E. Anderson
Attorney, Agent, or Firm—Kenyon & Kenyon

[57] ABSTRACT

This application is directed to light-weight and hard foam materials. The foams of this invention are prepared by extruding thermoplastic crystalline plastics in the presence of highly volatile organic liquids as the foaming agents. In accordance with the present method crystalline polyolefins, in the presence of polybutadiene, ethylenevinylacetate copolymers, ethylene-propylenes and/or ethylene-propylene terpolymer rubbers, and optionally radical formers such as suitable peroxides, azidene, sulfonyl azidene or the like, and inhibitors for radical decomposition, such as triallylcyanurate or an acrylate selected from the group consisting of trimethylolpropane-trimethacrylate, allyl-methacrylate, tetrahydrofurfurylmethacrylate, triethyleneglycol-dimethacrylate, polyethyleneglycol-dimethacrylate or the like, are converted into foam-like molded bodies by means of a highly volatile organic liquid foaming agent. The foaming agent is employed in an amount of from about 5 to about 30% by weight, based on the weight of the polyolefins. The foaming agent and the polyolefins are mixed in an extruder at a temperature of from about 180° to about 280° C., and at a pressure which is greater than the vapor pressure of the foaming agent. The mixture is subsequently extruded.

32 Claims, No Drawings

METHOD FOR THE MANUFACTURE OF LIGHTWEIGHT FOAM MATERIALS FROM CRYSTALLINE THERMOPLASTIC MATERIALS AND THE RESULTANT PRODUCTS

FIELD OF THE INVENTION

The present invention relates to a method for manufacturing light-weight foams which are also hard or tough, from crystalline thermoplastic (synthetic) materials. In accordance with the method of the present invention, light-weight foams are prepared by extruding a mixture of crystalline synthetic materials in the presence of a highly volatile organic liquid as the foaming agent.

BACKGROUND OF THE INVENTION

The manufacture of foams by extrusion foaming is known. However, known extrusion processes lead to relatively heavy and soft foam materials. Such foam materials are of limited utility for many applications, and are unsuited for applications where a high resistance to mechanical influences is required.

Light-weight foam materials prepared by extrusion foaming are disclosed by DE-AS 17 94 025. The foams disclosed by this reference are soft and flexible. One disadvantage associated with these foams lies in their inability to resist compression. Moreover, the method of preparation disclosed by the cited reference calls for the use of very large amounts of physical foaming agents. Thus, there are disadvantages associated with the properties of the foams disclosed by DE-AS 17 94 025, as well as with the method of foam preparation disclosed by this reference.

It is an object of this invention to provide a light-weight foam material which is also hard or brittle. Thus, the foams which are the subject of this invention combine the advantages of known light-weight foams such as polyolefin foams, with the desirable hard or brittle properties of other materials such as wood.

BRIEF DESCRIPTION OF THE INVENTION

This invention provides light-weight, but hard foam materials. The foams of this invention are prepared by extruding thermoplastic crystalline plastics in the presence of highly volatile organic liquids as the foaming agents. In accordance with the present method crystalline polyolefins, in the presence of polybutadiene, ethylenevinylacetate copolymers, ethylenepropylenes and/or ethylene-propylene terpolymer rubbers, and optionally;

(a) radical formers such as suitable peroxides, azidene, sulfonyl azidene or the like, and (b) inhibitors for radical decomposition, such as triallylcyanurate or an acrylate selected from the group consisting of trimethylolpropane-trimethacrylate, allyl-methacrylate, tetrahydrofurfuryl-methacrylate, triethyleneglycol-dimethacrylate, polyethyleneglycol-dimethacrylate or the like, are converted into foam-like molded bodies by means of a highly volatile organic liquid foaming agent. The foaming agent is employed in an amount of from about 5 to about 30% by weight, based on the weight of the polyolefins. The foaming agent and the polyolefins are mixed in an extruder at a temperature of from about 180° to about 280° C., and at a pressure which is greater than the vapor pressure of the foaming agent. The mixture is subsequently extruded.

In accordance with the method of this invention, polyolefin foam materials with specific bulk gravities of from about 30 to about 200 kg/m$^3$ are obtained. Such light-weight foam materials, which are at the same time hard and brittle, have heretofore been unknown to the art.

DETAILED DESCRIPTION OF THE INVENTION

Suitable crystalline polyolefins for use in accordance with the present method are the isotactic polypropylenes. Preferably, the polypropylenes are foamed in the presence of a polybutadiene, wherein the polybutadiene is present in an amount corresponding to from about 2 to about 20% by weight of the polypropylene and polybutadiene mixture. The mixture is foamed at a temperature of from about 140° to about 180° C.

Suitable polybutadienes include the 1,4-polybutadienes, as well as the liquid 1,2-polybutadienes having molecular weights of from about 500 to about 10,000 g/mol, and having a 1,2-content of at least 35%, and preferably having a 1,2-content of from about 80 to about 95%. Preferred polybutadienes have a molecular weight of from about 1,000 to about 3,000.

When polybutadienes such as those described above are employed, the product polypropylene foam materials may be cross-linked by means of high-energy radiation, such as by electron ray or gamma ray irradiation. The 1,2-content of the polybutadienes has an influence on the cross-linking; that is, the higher the 1,2-content of the polybutadienes, the lower are the radiation doses required for cross-linking the foam for the same amount of polybutadiene. For example, in order to cross-link by electron irradiation a foam with a polybutadiene content of 10% by weight (based on the weight of the polypropylene), wherein the polybutadiene has a molecular weight of 3000 g/mol, and a 1,2-content of 95%, a dose of 5 Mrad is sufficient. An Mrad is defined as 10 (kilojoules of radiation/kilograms of material irradiated). The cross-linked product will have a gel content of about 70%, as determined in boiling xylol. The cross-linking process yields a foam material which is both mechanically and chemically resistant.

In general, radiation doses of from about 0.5 to about 20 Mrads may be successfully employed for cross-linking the foam material. The dose selected depends upon the degree of cross-linking desired and the ultimate properties desired for the final cross-linked product. The higher the degree of cross-linking, the harder and more brittle the foam material becomes.

Preferably, the isotactic polypropylenes are foamed in the presence of from about 0.1 to about 5.0% by weight of radical formers, and from about 0.1 to about 10.0% by weight of radical decomposition inhibitors.

Highly volatile organic liquids are suitable for use as the foaming agents of the present invention. Thus suitable foaming agents include highly volatile hydrocarbons, fluorocarbons, chlorocarbons, fluorochlorocarbons or the like. The foaming agents are employed in amounts corresponding to from about 5 to about 30% and preferably from about 10 to about 15% by weight, based on the weight of the polyolefin components. The foaming agent must be highly soluble in the polymer, and must be retained by the expanding polymer during the foaming process. This is particularly important for the manufacture of light-weight foam materials. If the necessary amount of foaming agent is not held fast and retained by the polyolefin mixture during the foaming process, although light-weight products are obtained for a short time after leaving the extruder, they collapse upon cooling down. This may be the reason that in the process described in DE-AS 17 94 025 relatively large amounts of foaming agent are required. The process disclosed by this reference requires about four- to five-times the amount of foaming agent, than is employed in accordance with the method of this invention. The use of small amounts of foaming agent called for by the present method lowers the overall cost of manufacturing the light-weight foam products of this invention.

It is possible to foam crystalline polyolefins, such as the preferred isotactic polypropylenes, in the presence of polybutadienes by employing volatile solvents as foaming agents. It may be desirable, however, to modify the extrusion foaming process of this invention such that a mixture of high-molecular weight and branched polyolefins are obtained during the process, along with a simultaneous increase in the presence of low-molecular weight polyolefin components. Such mixtures are produced by reactions initiated by adding radical formers to the other reaction components, i.e., the crystalline polyolefin and the polybutadiene. Such radical formers include the peroxides, azides, sulfonyl azides and the like. When polypropylene is employed as the crystalline polyolefin, a further component must be added to the reaction mixture which prevents radical decomposition. Suitable radical decomposition inhibitors include acrylates such as trimethylolpropane-trimethacrylate, allyl-methacrylate, tetrahydrofurfuryl-methacrylate, triethyleneglycol-dimethacrylate, polyethyleneglycol-dimethacrylate and the like, as well as triallylcyanurate, or polybutadiene. The preferred polybutadiene is a 1,2-polybutadiene having at least about a 35% 1,2-content. Inhibitors are recommended for use not only with the preferred isotactic polypropylenes, but also for use with other crystalline polyolefins, such as the polyethylenes.

As a result of the use of the radical formers discussed above, radicals are formed on the polyolefin chains which are made to recombine only in part with other polyolefin chains. In this manner, an increase in the molecular weight of the polyolefins is achieved. The process is carried out only to the extent that a maximum of 5% by weight of gel components which are insoluble in boiling xylol are produced. Moreover, through the use of suitable reaction mixtures part of the polyolefin, and in particular the polypropylene, is decomposed such that a mixture of polyolefins is obtained. This mixture contains a broad distribution of branched and straight-chain polyolefins ranging from low-molecular weight to high-molecular weight polyolefin components. Such mixtures are described in Examples 1 to 6.

Due to the branching, the molecular-weight distributions cannot be precisely determined. For the polypropylenes of Example 5, however, the molecular weight distribution spans a range of from about 1,000 to 4,000,000 gm/mol, with a maximum between about 100,000 and about 200,000. About 4.1% by weight of the modified polypropylene of Example 5 had a molecular weight of from about 1,100,000 and about 9,000,000 gm/mol. Prior to the modification, only 0.05 weight % of the polypropylene had a molecular weight of from about 1,100,000 to about 2,000,000 gm/mol. In the low-molecular region, the weight share of the polypropylene of Example 5 with a molecular weight of from about 600 to about 30,000 gm/mol was 21.8%. The unmodified polypropylene, however, had only 11.9% by weight in the range of from about 3,700 to about 30,000 gm/mol.

When radical former is not employed, it is preferred to employ polyolefins with a broad distribution of molecular weights. Broad molecular weight distributions are readily obtained by mixing polypropylenes of different molecular weights, as disclosed by Examples 7 and 8. It is also possible to employ polypropylenes which are commercially available in the form of a distribution of polypropylenes of various molecular weights. The use of such commercially available polypropylenes is disclosed by Example 9. However, under the same extrusion conditions, a finished foam material having a coarser pore pattern is obtained through the use of such commercially available polypropylenes, as compared to foam materials prepared from polypropylene mixtures prepared by mixing polypropylenes of different molecular weights.

As shown by Example 10, it is necessary in all cases to use a polybutadiene and/or ethylenevinylacetate copolymer or ethylene-propylene or ethylene-propylene terpolymer rubber component. Preferably they are employed in amounts of 2 to 20 weight % relative to the weight of the polypropylene component.

During the foaming process, the high-molecular polyolefins form a framework which prevents the forming foam from collapsing. The low-molecular weight components insure that the physical foaming agents are sufficiently soluble in the polyolefins. This facilitates the extrusion foaming process due to the fact that the extrusion can take place at temperatures lower than those employed by comparable processes. As low-molecular weight components, the 1,2-polybutadienes, in particular, fulfill this task with surprisingly good success.

It is advisable to add the supplemental substances such as 1,2-polybutadiene, between the charging opening of the extruder and about 15 D. The preferred addition is made between 2 D and 5 D, i.e., through an inlet positioned at a length measured from the charging opening of between 2 times and 5 times the diameter of the screw.

In accordance with the method of this invention, lightweight polyolefin foam materials with specific bulk gravities below about 200 kg/m$^3$ can be obtained through direct gas application, by means of customary machines such as single- or twin-screw extruders, or the so-called tandem systems. Through the modification of the starting materials described above, a considerable reduction in the amount of foaming agents employed is accomplished. Additionally, customary substances such as metal powders, pigments, azodicarbonamide and sodium bicarbonate with citric acid can be used as nucleation agents (pore regulators).

The invention will be described further with reference to the following examples.

EXAMPLE 1

100 parts by weight isotactic polypropylene with a density of 0.90, and a melting index MFI 230° C./2.16 kg; 16 to 20 g/10 min are mixed with 0.5 parts by weight azodicarbonamide, as the pore regulator, as well as with 0.8 parts by weight α,α′-bis (t-butylperoxy)p-isopropyl benzene, a radical former. The mixture is extruded at the rate of 10 kg of material per hour (10 kg/h) by a twin screw extruder (D=34, L (length)=38 D), whereby beyond 5 D a liquid 1,2-polybutadiene with a molecular weight of 3000 g/mol is added at the rate of 0.4 kg/h. The temperature of the melt at the injection point is advantageously between about 180° and about 220° C.

Beyond 15 D, monofluorotrichloromethane is injected at the rate of 0.8 kg/h into the melted polypropylene, which is at a temperature of about 240° C.

During this process, the pressure must be higher than the vapor pressure of the monofluorotrichloromethane at the operating temperature of about 240° C. After the monofluorotrichloromethane has been added to the melt, the latter is cooled down in the extruder to 135° C. After leaving the nozzle, the product foams up and produces a foam material with a specific bulk gravity of 100 kg/m$^3$.

EXAMPLES 2–6

In accordance with the procedure of Example 1, foam materials with specific bulk gravities of from 30 to 200 kg/m$^3$ are obtained employing the polypropylene of Example 1, in the formulations set forth in Examples 2–6 of Table I.

TABLE I

| Example | Radical Former | Nucleation | Additive | Foaming Agent | Specific Bulk Gravity of the Foam (Kg/m$^3$) |
|---|---|---|---|---|---|
| 2 | 0.4 wt. % α-α' Bis(t-butylperoxy) p-diisopropylbenzene | 0.5 wt % Azodicarbonamide | 4 wt % Polybutadiene, Molecular wt 3000 | 5 wt % monofluorotrichloromethane | 200 |
| 3 | 0.6 wt % α-α' Bis(t-butylperoxy) p-diisopropylbenzene | 0.5 wt % Azodicarbonamide | 4 wt % Polybutadiene, Molecular wt 3000 | 8 wt % monofluorotrichloromethane | 100 |
| 4 | 0.8 wt % α-α' Bis(t-butylperoxy) p-diisopropylbenzene | 0.5 wt % Azodicarbonamide | 6 wt % Polybutadiene, Molecular wt 3000 | 10 wt % monofluorotricarbonmethane | 50 |
| 5 | 0.8 wt % α-α' Bis (t-butylperoxy) p-diisopropylbenzene | 0.5 wt % Azodicarbonamide | 5 wt % Polybutadiene, Molecular wt 3000 | 15 wt % monofluorotrichloromethane and trifluorotrichloroethane (1:1) | 30 |
| 6 | 0.8 wt % α-α' Bis(t-butylperoxy) p-diisopropylbenzene | 0.5 wt % Azodicarbonamide | 7 wt % Polybutadiene, Molecular wt 3000 | 15 wt % monofluorotrichloromethane and trifluorotrichloroethane (1:1) | 30 |

The foams produced by this method having a specific bulk gravity of 50 kg/m$^3$ can withstand a compression load of 47 N/cm$^2$. Such foams are deformed by only about 2 mm, and break down above 47 N/cm$^2$. N refers to one Newton or 10$^5$ dynes.

Gal-chromatography examination of the polypropylene of Example 5 showed the presence of 4.1 weight % polypropylene with a molecular weight in the range of 1,100,000 to 9,000,000 gm/mol. The starting polypropylene reactant contained less than 0.05 weight % polypropylene with a molecular weight above about 1,100,000 gm/mol. The weight average of the molecular weight of the starting polypropylene was 200,000 gm/mol. The weight average of the molecular weight of the modified polypropylene was 236,000 gm/mol.

EXAMPLE 7

30 parts by weight of a polypropylene with an average molecular weight of 200,000 gm/mol are mixed with 40 parts by weight of a polypropylene with an average molecular weight of 400,000 gm/mol, as well as with 20 parts by weight of a polypropylene with an average molecular weight of 640,000 gm/mol, and 10 parts by weight of a propylene with an average molecular weight of 800,000 gm/mol; 0.2 parts by weight azodicarbonamide is added to this mixture.

The mixture is extruded at the rate of 10 kg/h via a twin-screw extruded (D=34, L=28 D), where beyond 5 D, liquid 1,2-polybutadiene with a molecular weight of 3000 g/mol is added at the rate of 1 kg/h.

Beyond 15 D, monofluorotrichloromethane and trifluorotrichloroethane (mixed 1:1) are injected at the rate of 1.4 kg/h into the melted polypropylene at a temperature of about 250° C. During this process, the pressure in the melt must be higher than the vapor pressure of the monofluorotrichloromethane, at a temperature of about 250° C. After the monofluorotrichloromethane/trifluorotrichloroethane mixture has been added to the melt, the latter is cooled in the extruder down to about 155° C.

After leaving the nozzle, the product foams up and yields a foam material with a specific bulk gravity of 40 kg/m$^3$.

The foam material produced in this manner can be crosslinked with electron rays at a dose of 6 Mrad to the extent that the gel content in boiling xylol is 80%.

EXAMPLE 8

30 parts by weight of a polypropylene with an average molecular weight of 200,000 gm/mol are mixed with 40 parts by weight of a polypropylene with an average molecular weight of 400,000 gm/mol, as well as with 30 parts by weight of a polypropylene with an average molecular weight of 800,000 gm/mol. 0.2 parts by weight of azodicarbonamide is added to this mixture.

The mixture is extruded at the rate of 10 kg/h via a twin-screw extruder (D=34, L=28 D). Beyond 5 D, liquid 1,2-polybutadiene with a molecular weight of 3000 g/mol is added at the rate of 1 kg/h. Beyond 15 D, monofluorotrichloromethane and trifluorotrichloroethane (mixed 1:1) are injected into the melted polypropylene at a rate of 1.4 kg/h, which is at a temperature of about 250° C. The pressure of the melt must be higher than the vapor pressure of the monofluorotrichloromethane at a temperature of about 250° C. After the monofluorotrichloromethane/trifluorotrichloroethane mixture has been added, the melt is cooled in the extruder down to 155° C. After leaving the nozzle, the product foams up, and yields a foam material with a specific bulk gravity of 40 kg/m³.

obtained by employing the formulations of Examples 11–13.

TABLE II

| Example | Weight % and Average Molecular Weight of the Polypropylene | Nucleation | Additive | Foaming Agent | Specific Bulk Gravity of the Foam (Kg/m³) |
|---|---|---|---|---|---|
| 11 | 30 wt % 200 kg/mol<br>40 wt % 400 kg/mol<br>30 wt % 800 kg/mol | 0.2 wt % Azodicarbonamide | 2 parts by weight, polybutadiene, molecular wt 3000 g/mol | 15 wt % monofluorotrichloromethane and trifluorotrichloroethane (1:1) | 100 |
| 12 | as per Example 11 | 0.2 wt % Azodicarbonamide | 5 parts by weight, polybutadiene, molecular wt 3000 g/mol | 15 wt % monofluorotrichloromethane and trifluorotrichloroethane (1:1) | 80 |
| 13 | as per Example 11 | 0.2 wt % Azodicarbonamide | 20 parts by weight, ethylene-propylene-copolymer (EPM) | 15 wt % monofluorotrichloromethane and trifluorotrichloroethane (1:1) | 100 |

EXAMPLE 9

100 parts by weight of a polypropylene with an average molecular weight of 400,000 gm/mol is reacted with 0.2 parts by weight azodicarbonamide.

The mixture is extruded at the rate of 10 kg/h, via a twin-screw extruder (D=34, L=28 D). Beyond 5 D, liquid 1,2-polybutadiene with a molecular weight of 3000 g/mol is added at the rate of 1 kg/h. Beyond 15 D, 1.4 kg/h of monofluorotrichloromethane and trifluorotrichloroethane (mixed 1:1) are injected into the melted polypropylene which is at about 250° C. The pressure in the melt must be higher than the vapor pressure of the monofluorotrichloromethane at a temperature of about 250° C. After the monofluorotrichloromethane/trifluorotrichloroethane mixture has been added, the melt is cooled down to 155° C. in the extruder. After leaving the nozzle, the product foams up and yields a foam material with a specific bulk gravity of 40 kg/m³.

EXAMPLE 10

The polypropylene mixture of Example 8 was extruded under the same conditions as described in Example 8, but without the addition of polybutadiene. The foam material obtained had a specific bulk weight of only about 650 kg/m³.

EXAMPLES 11–13

Following the procedure of Example 9, foam materials having specific bulk weights of 80 and 100 kg/m³ are

EXAMPLE 14

100 parts by weight polyethylene (density 0.96; melting index MFI 190° C./5 kg; 4 g/10 min) are mixed with 0.5 parts by weight azodicarbonamide, a pore regulator, as well as with 0.1 parts by weight dicumylperoxide, a radical former. The mixture is extruded at the rate of 10 kg/h in a twin-screw extruder (D=34, L=28 D), where beyond 5 D a liquid polybutadiene with a molecular weight of 3000 g/mol is added at the rate of 0.4 kg/h.

Beyond 15 D, monofluorotrichloromethane is injected into the melted polyethylene which is at a temperature of approximately 200° C. at the rate of 1.4 kg/h. The pressure in the melt must be higher than the vapor pressure of the monofluorotrichloromethane at a temperature of 200° C. After the monofluorotrichloromethane has been added to the melt, the latter is cooled in the extruder down to 90° C. After leaving the nozzle, the product foams up and yields a foam material with a specific bulk gravity of 50 kg/m³.

EXAMPLES 15–18

Table III sets forth the specific bulk gravities of foams obtained by employing the polyethylene of Example 14 and the formulations of Examples 15–18. The preparative procedure followed is that of Example 14.

TABLE III

| Example | Radical Former | Nucleation | Additive | Foaming Agent | Specific Bulk Gravity of the Foam (Kg/m³) |
|---|---|---|---|---|---|
| 15 | 0.2 wt % dicumylperoxide | 0.2 wt % azodicarbonamide | — | 10 wt % monofluorotrichloromethane | 80 |
| 16 | 0.1 wt % dicumylperoxide | 0.2 wt % azodicarbonamide | 0.2 wt % polybutadiene molecular weight 3000 | 18 wt % monofluorotrichloromethane | 30 |
| 17 | 0.05 wt % dicumylperoxide | 0.2 wt % azodicarbonamide | 0.6 wt % polybutadiene molecular weight 3000 | 14 wt % monofluorotrichloromethane | 50 |
| 18 | 0.2 wt % | 0.2 wt % | 0.1 wt % | 8 wt % mono- | 100 |

TABLE III-continued

| Example | Radical Former | Nucleation | Additive | Foaming Agent | Specific Bulk Gravity of the Foam (Kg/m$^3$) |
|---|---|---|---|---|---|
| | dicumylperoxide | azodicarbon-amide | polybutadiene molecular weight 3000 | fluorotrichloro-methane | |

This invention has been described in terms of specific embodiments set forth in detail herein. It should be understood, however, that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed embodiments are considered to be within the scope of this invention and the following claims.

I claim:

1. A method of preparing a lightweight foam material which comprises:
   (a) forming a melt of a crystalline polyolefin in the presence of about 2 to 20 percent by weight of said crystalline polyolefin of a second polyolefin component in an extruder; wherein said second polyolefin component is selected from the group consisting of polybutadiene, an ethylene vinylacetate copolymer and an ethylene-propylene terpolymer; said melt including a radical former and a radical decomposition inhibitor wherein said radical decomposition inhibitor is selected from the group consisting of: trimethylolpropanetrimethacrylate, allyl-methacrylate, tetrahydrofurylmethacrylate, triethyleneglycol-dimethacrylate and polyethylene glycol-dimethylacrylate; and
   (b) injecting a volatile organic solvent foaming agent into said melt, said foaming agent comprising from about 5 to 30% by weight of said polyolefins and wherein said foaming agent and said melt are mixed at a temperature of about 180° C. to about 280° C., and at a pressure which is greater than the vapor pressure of the foaming agent, followed by
   (c) extruding said melt and foaming agent from said extruder to provide a foam product having a specific bulk weight of from about 30 to about 200 kg/m$^3$.

2. The method according to claim 1 wherein said crystalline polyolefin is polypropylene, and said mixture comprising said melt further includes a radical former which is selected from the group consisting of peroxide, azidene, or sulfonyl azidene radical formers, and wherein said second polyolefin component is polybutadiene, having a molecular weight of from about 1000 to 3000 g/mol.

3. The method according to claim 1 wherein said liquid polybutadienes have molecular weights of from about 500 to about 10,000 g/mol.

4. The method according to claim 3 wherein said liquid polybutadienes have molecular weights of from about 1,000 to about 3,000 g/mol.

5. The method according to claim 4 wherein said polybutadienes have a vinylpolybutadiene content of at least about 35%.

6. The method according to claim 5 wherein said vinylpolybutadiene content is from about 85 to about 95%.

7. The method according to claims 1 or 4 wherein said polybutadienes have carboxyl or hydroxyl substituents.

8. The method according to claim 1 wherein said polypropylene and said polybutadienes are fed into said extruder between the charging opening of the extruder and about 15 D.

9. The method according to claim 1 wherein said crystalline polyolefins are foamed in the presence of polybutadienes by means of volatile fluorocarbon foaming agents, said foaming agents being present in an amount of from about 5 to about 20 weight % of said mixture; and wherein said crystalline polyolefins and said polybutadiene are fed into said extruder between 2 D and 15 D.

10. The light-weight foam prepared in accordance with the method of claims 3 or 4 or 5 or 6 or 1 or 2.

11. The light-weight foam prepared in accordance with the method of claim 7.

12. The light-weight foam prepared in accordance with the method of claims 8 or 9.

13. The light-weight foam prepared in accordance with claim 8.

14. A method of preparing a light-weight foam material which comprises:
   (a) forming a melt in an extruder of a crystalline polypropylene in the presence of a radical former selected from the group consisting of the peroxide, azidene and sulfonyl azidene radical formers, said melt also including a radical decomposition inhibitor which is polybutadiene; and
   (b) injecting from about 5 to about 30% by weight of a volatile organic solvent foaming agent into said melt, wherein said foaming agent and said melt are mixed at a temperature of about 180° C. to about 280° C., and at a pressure which is greater than the vapor pressure of said foaming agent; followed by
   (c) extruding said melt and foaming agent from said extruder to provide a foam product having a specific bulk weight of from about 30 to about 200 kg/m$^3$.

15. The method according to claim 14 wherein said polybutadiene is a liquid polybutadiene having a molecular weight of from about 1,000 to about 3,000.

16. The method according to claim 14 or 15 wherein said polybutadiene has at least about a 35% 1,2-content.

17. The method according to claim 16 wherein said polybutadiene has a 1,2-content of about 80 to about 95%.

18. The method according to claim 14 wherein said polypropylene is isotactic polypropylene.

19. The method according to claim 18 wherein said isotactic polypropylene is foamed in the presence of radical formers and radical decomposition inhibitors, wherein said radical formers are employed in an amount corresponding to from about 0.1 to about 5.0 weight %, based on the weight of said isotactic polypropylenes; and said radical decomposition inhibitors are employed in an amount corresponding to from about 0.1 to about 10 weight %, based on the weight of said isotactic polypropylenes.

20. The method according to claim 14 wherein said radical formers comprise from about 0.1 to about 5.0 percent based on the weight of said polypropylene component.

21. The method according to claims 14 or 15 or 16 or 17 wherein said polypropylene and polybutadiene are foamed by means of a volatile fluorocarbon foaming agent, said foaming agent comprising from about 5 to about 20% by weight of said polypropylene and polybutadiene, and said polybutadiene and polypropylene are fed into said extruder between about 2 D and 15 D.

22. The method according to claim 14 wherein said polypropylene and said polybutadiene are fed into said extruder between the charging opening of said extruder and about 15 D.

23. The method according to claim 14 wherein said melt of step (a) comprises about 4 to about 7 weight percent of a polybutadiene having a molecular weight of about 3,000; about 0.4 to about 0.8 weight percent of a radical former; and a pore regulator, said foam having a specific bulk gravity of from about 30 to about 200 kg/m$^3$.

24. The method according to claim 14 wherein said polypropylene comprises a polypropylene having a molecular weight distribution of from about 200 kg/mole to about 800 kg/mole.

25. The method according to claim 14 wherein said polypropylene has an average molecular weight of about 400 kg/mole.

26. The method according to claim 14 wherein said foam has a specific bulk gravity of from about 30 to about 200 kg/m$^3$.

27. A method of preparing a light-weight foam material which comprises:
   (a) forming a melt in an extruder of a crystalline polypropylene and about 2 to 20 percent by weight of the polypropylene of a polybutadiene polymer; and
   (b) injecting a volatile organic solvent foaming agent into said melt, said foaming agent comprising from about 5 to about 30% by weight of said polypropylene and polybutadiene, and wherein said foaming agent and said melt are mixed at a temperature of from about 180° C. to about 280° C., and at a pressure which is greater than the vapor pressure of the foaming agent; followed by
   (c) extruding said melt to provide a foam, and then
   (d) cross-linking said foam by subjecting it to electron beam irradiation.

28. The method according to claim 27 wherein said foam is cross-linked by irradiation with electron rays of from about 0.5 to about 20 Mrad.

29. The method according to claim 27 wherein said foam is cross-linked by irradiation to the extent that it exhibits a gel content of from about 10 to about 100%.

30. The foam product prepared in accordance with the method of claims 14 or 27.

31. The light-weight foam prepared in accordance with claim 28.

32. The light-weight foam prepared in accordance with claim 29.

* * * * *